United States Patent
McCauley et al.

(10) Patent No.: US 7,636,150 B1
(45) Date of Patent: Dec. 22, 2009

(54) METHOD AND SYSTEM TO ENHANCE TIMING ACCURACY FOR TIME-OF-FLIGHT SYSTEMS

(75) Inventors: Richard J. McCauley, Sunnyvale, CA (US); Dana R. Snow, Santa Clara, CA (US)

(73) Assignee: Canesta, Inc., Sunnyvale, CA (US)

( * ) Notice: Subject to any disclaimer, the term of this patent is extended or adjusted under 35 U.S.C. 154(b) by 0 days.

(21) Appl. No.: 11/998,713

(22) Filed: Nov. 30, 2007

Related U.S. Application Data (60) Provisional application No. 60/872,167, filed on Dec. 1, 2006.

(51) Int. Cl.
*G01C 3/08* (2006.01)
(52) U.S. Cl. .................. 356/5.01; 356/5.1; 356/5.15
(58) Field of Classification Search ........... 356/3.01–22
See application file for complete search history.

(56) References Cited

U.S. PATENT DOCUMENTS 6,462,705 B1 * 10/2002 McEwan .................. 342/175
7,405,812 B1 * 7/2008 Bamji ...................... 356/5.1

* cited by examiner

*Primary Examiner*—Thomas H Tarcza
*Assistant Examiner*—Luke D Ratcliffe
(74) *Attorney, Agent, or Firm*—Michael A. Kaufman, Esq.

(57) ABSTRACT

A method and system to enhance accuracy of measurement of distance Z in a TOF system dynamically provides tight control over the phase and/or timing relationship of clock pulses used in the TOF system. Enhanced frequency control is imposed over a high speed oscillator whose output(s) control a timing generator, whose outputs are coupled to circuitry associated with the detection array in the TOF system, and with the TOF clock timing circuitry. The timing generator is coupled to a delay locked loop (DLL) and/or phase lock loop (PLL), which loop(s) are feedback coupled to the waveform circuit that drives the source of electromagnetic energy emitted by the TOF system.

20 Claims, 3 Drawing Sheets

METHOD AND SYSTEM TO ENHANCE TIMING ACCURACY FOR TIME-OF-FLIGHT SYSTEMS

RELATION TO APPLICATION

Priority is claimed to U.S. provisional patent application Ser. No. 60/872,167, entitled "Method and System to Enhance Timing Accuracy for Time-of-Flight Systems", filed 1 Dec. 2006, and assigned to Canesta, Inc. of Sunnyvale, Calif., assignee herein.

FIELD OF THE INVENTION

The invention relates generally to time-of-flight (TOF) detection systems including phase-based TOF, and more particularly to enhancing accuracy of the timing circuitry used in such systems such that Z distance measurement accuracy is enhanced.

BACKGROUND OF THE INVENTION

Time-of-flight (TOF) systems that provide a measure of distance (Z) from the system to a target object without depending upon luminosity or brightness information obtained from the target object are known in the art. See for example U.S. Pat. No. 6,323,942 entitled CMOS-Compatible Three-Dimensional Image Sensor IC (2001), assigned to Canesta, Inc., now of Sunnyvale, Calif. TOF systems according to the '942 patent emit optical energy and determine how long it takes until at least some of that energy reflected by a target object arrives back at the system to be detected. Emitted optical energy traversing to more distant surface regions of a target object before being reflected back toward the system will define a greater TOF than if the target object were closer to the system. If the roundtrip TOF time is denoted t1, then the distance between target object and the TOF system is Z1, where Z1=t1·C/2, where C is velocity of light. Such systems can acquire both luminosity data (signal amplitude) and TOF distance, and can realize three-dimensional images of a target object in real time.

Figure 1A:
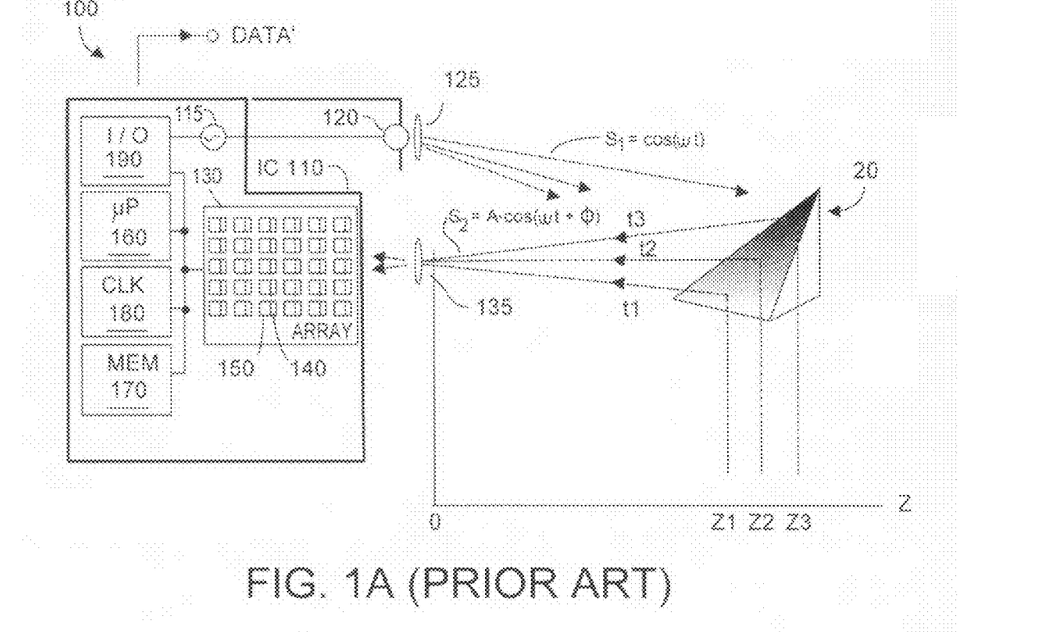
FIG. 1A is a block diagram depicting a phase-shift three-dimensional imaging system as exemplified by U.S. Pat. No. 6,515,740 and U.S. Pat. No. 6,580,496, according to the prior art.

A more sophisticated TOF system is exemplified by U.S. Pat. Nos. 6,515,740 (2003) and 6,580,496 (2003) respectively Methods and Systems for CMOS-Compatible Three-Dimensional Imaging Sensing Using Quantum Efficiency Modulation, assigned to Canesta, Inc., now of Sunnyvale, Calif. FIG. 1A depicts an exemplary phase-shift detection system 100 according to the '740 or the '296 patents, a system in which TOF is determined by examining relative phase shift between transmitted light signals and signals reflected from the target object. Detection of the reflected light signals over multiple locations in the system pixel array results in measurement signals that are referred to as depth images.

Referring to FIG. 1A, TOF system 100 includes a two-dimensional array 130 of optical detectors 140, each of which has dedicated circuitry 150 for processing detection charge output by the associated detector. In a typical application, array 130 might include 100×100 pixels 230, and thus include 100×100 processing circuits 150. IC 110 also includes a microprocessor or microcontroller unit 160, memory 170 (which preferably includes random access memory or RAM and read-only memory or ROM), a high speed distributable clock 180, and various computing and input/output (I/O) circuitry 190. Among other functions, controller unit 160 may perform distance to object and object velocity calculations. With respect to processing detected TOF signals, portions of unit 180 and array 130 may be referred to herein collectively as a time measuring unit.

Under control of microprocessor 160, appropriately controlled drive waveforms are output by a generator 115 and use to control a source of optical energy 120, which is thus periodically energized and emits optical energy via lens 125 toward an object target 20. Collectively, the term "emitter unit" may be used to encompass generator 115 and optical energy source 120. Typically the optical energy is light, for example emitted by a laser diode or LED device 120. Some of the emitted optical energy will be reflected off the surface of target object 20, and will pass through an aperture field stop and lens, collectively 125, and will fall upon two-dimensional array 130 of pixel (optical energy) detectors 140 where an image is formed. In some implementations, each imaging pixel detector 140 captures time-of-flight (TOF) required for optical energy transmitted by emitter 120 to reach target object 20 and be reflected back for detection by two-dimensional sensor array 130. The optical detectors in array 130 can operate synchronously relative to optical energy from the emitter unit. If desired, such synchronous detection operation may be implemented with an electronic high speed shutter mechanism perhaps associated with lens 125. Using this TOF information, distances Z can be determined. Advantageously system 100 can be implemented on a single IC 110, without moving parts and with relatively few off-chip components.

Figure 1B:
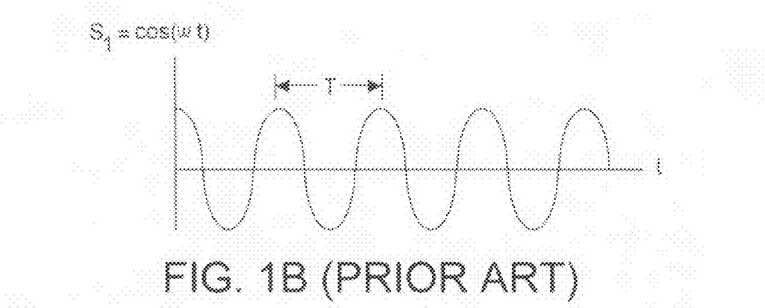
FIGS. 1B and 1C depict exemplary waveform relationships for the block diagram of FIG. 1A, according to the prior art.

An exciter 115 drives an optical energy emitter 120 with a preferably low power (e.g., perhaps 50 mW peak) periodic waveform, producing optical energy emissions of known frequency (perhaps 50 MHz to a few hundred MHz) for a time period known as the shutter time (perhaps 10 ms). Energy from emitter 120 and detected signals within pixel detectors 140 are synchronous to each other such that phase difference and thus distance Z can be measured for each pixel detector. The exemplary waveform in FIG. 1B is typical of an emitted $S_1$ signal, whereas the phase-delayed signal of FIG. 1B is an exemplary return signal $s_2$ that will be detected by TOF system 100 and processed to yield information, include distance Z to target object 20.

Figure 1C:
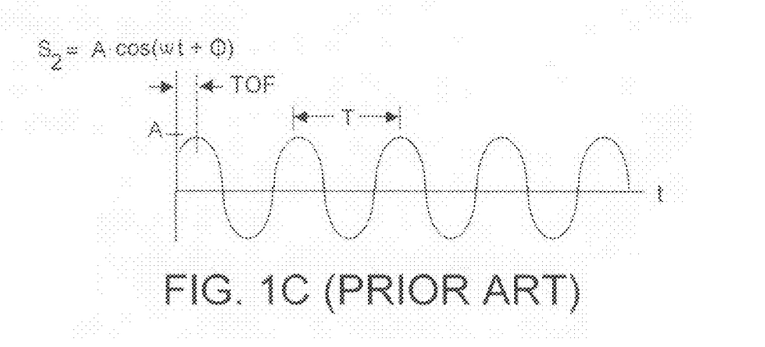

The optical energy detected by the two-dimensional imaging sensor array 130 will include amplitude or intensity information, denoted as "A", as well as phase shift information, denoted as $\phi$. As depicted in exemplary waveforms in FIGS. 1B and 1C, the phase shift information varies with distance Z and can be processed to yield Z data. For each pulse or burst of optical energy transmitted by emitter 120, a three-dimensional image of the visible portion of target object 20 is acquired, from which intensity and Z data is obtained (DATA'). As described in U.S. Pat. Nos. 6,515,740 and 6,580,496 obtain depth information Z requires acquiring at least two samples of the target object (or scene) 20 with 90° phase shift between emitted optical energy and the pixel detected signals. While two samples is a minimum figures, preferably four samples, 90° apart in phase, are acquired to permit detection error reduction due to mismatches in pixel detector performance, mismatches in associated electronic implementations, and other errors. On a per pixel detector basis, the measured four sample data are combined to produce actual Z depth information data.

Understandably, the accuracy of Z distance measurements can be affected by the accuracy of the clock timing signals coupled to exciter 115, and to the control of phase and/or shape of the signals output by emitter 120. Accurate Z measurements require that the phase of the signal output by emitter 120 be both stable and known relative to the phase (or any of the multiple phases) associated with time measuring unit 180 of system 100, otherwise, time measurement accuracy is degraded.

For example, consider a high resolution TOF system 100 as shown in FIG. 1A that emits electromagnetic (EM) radiation, which EM radiation travels about 1 cm for every 33 ps (1 picoseconds being $1 \times 10^{-12}$ seconds). Thus, for a 1 cm change in distance Z, the roundtrip TOF interval is only 66 ps. If there were no other error sources in TOF system 100, the error budget to maintain 1 cm Z distance measurement accuracy must be within 66 ps, which is to say that relative phase/timing inaccuracies associated with emitted signal $S_1$ and a time measurement system must be within a total of 66 ps.

In practice, for many TOF systems changes in environmental conditions can easily cause more than 66 ps of variation in the relative phase/timing of the emitted signal(s) and time measurement system. Additionally, it is also important to maintain other phase/timing relationships critical to the time measurement, such as in the timing generator and timing measurement unit, collectively 180 in FIG. 1A, to the same level of accuracy.

What is needed is an enhanced method and system to promote measurement accuracy in a TOF system, where it is understood that the TOF system may utilize time-of-flight and/or phase shift data to determine distance Z. Preferably such method and system should include a frequency control mechanism, a highly accurate multi-phase clock timing generator, pulse shaping for driver of the TOF optical source, and a feedback mechanism to dynamically adjust phase of emitted signals such that emitted signal phase is maintained substantially constant relative to that of the time measurement system. Preferably such method and system should be CMOS-compatible and preferably implementable on the same IC chip containing much of the TOF system.

The present invention provides such a method and system.

SUMMARY OF THE PRESENT INVENTION

The present invention enhances z distance measurement accuracy in TOF systems, including time-of-flight per se and/or phase-type TOF systems. Z distance measurement accuracy is enhanced by dynamically providing tight control over the phase and/or timing relationship of clock pulses used in the TOF system.

In one embodiment, enhanced frequency control is imposed over a high speed oscillator whose output(s) control a timing generator, whose outputs are coupled to circuitry associated with the optical detection array in the TOF system, and with the TOF clock timing circuitry. The timing generator is coupled to a delay locked loop (DLL) and/or phase locked loop (PLL) that is feedback coupled to the waveform circuit that drives the source of electromagnetic energy emitted by the TOF system.

Aspects of the present invention enable precise control of the emitted optical energy signal from the TOF system. Such control includes independent control over relative emitted phase shift, and well as independent control over the leading edge, the trailing edge, the pulse width of emitted optical energy in the form of pulses.

Preferably the present invention is implemented using CMOS fabrication on the same IC chip that contains much of the phase-based TOF system.

Other features and advantages of the invention will appear from the following description in which the preferred embodiments have been set forth in detail, in conjunction with their accompanying drawings.

DETAILED DESCRIPTION OF THE PREFERRED EMBODIMENT

Figure 2:
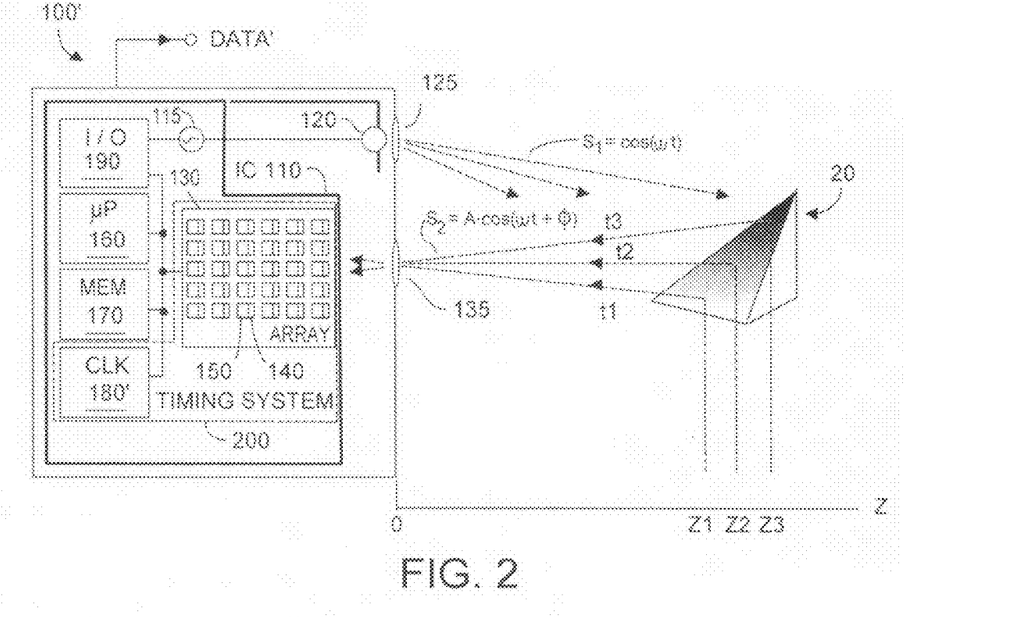
FIG. 2 is a block diagram depicting a TOF system with enhanced timing accuracy, according to an embodiment of the present invention.

FIG. 2 depicts a TOF system 100' that in many respects is similar to system 100 shown in FIG. 1A. However TOF system 100' includes an enhanced timing unit 200', according to the present invention. Unless otherwise stated, reference numerals in FIG. 2 may be understood to refer to elements identical to what has been described with respect to system 100 in FIG. 1A. As such, it is understood that the various embodiments of system 100' described below are preferably fabricated using CMOS technology upon a common integrated circuit substrate, such as IC 110.

As used herein, the collective expression "enhanced measurement system" shall refer to a system block such as 200 in FIG. 2. At a minimum, system block 200 gathers raw measurement data, which data are stored, interpreted, and transformed into usable Z distance data elsewhere in system 100'. For a typical optical TOF system 100', enhanced measurement system 200 includes an optical array 130, which comprises individual active pixels that each include a detector element 140 and dedicated active circuitry 150. As used herein, the term "timing generator" shall refer to a system block, such as 220, whose input(s) are high speed clock signal(s) and/or multiple phases of a delay chain output from a high speed oscillator 210. Timing generator 220 outputs signal(s) having precise phase relationship to each other and/or to the input clock signal(s), for use by circuitry within detector array 130, and the TOF clock circuitry 180'. As described later herein, the timing generator output(s) are coupled to a delay lock loop (DLL) 230, whose output(s) are feedback coupled to the waveform generator 115 whose output(s) drive optical energy source 120.

According to the present invention, accurate timing relationships are enhanced using frequency control of high-speed oscillator 210, preferably using a phase locked loop (PLL), or a software controlled loop. Those skilled in the art will recognize that a PLL system can control frequency and phase of an oscillator output relative to frequency and phase of a stable reference clock input signal. In the present invention, such frequency control of a high speed oscillator maintains long-term average oscillator frequency and, hence, timing relationships of the timing generator output clocks, as expressed in units of time. Preferably long-term average oscillator clock frequency is well-controlled to better than about ±0.5% of nominal frequency, and preferably to within about ±0.25% of nominal frequency or better, where "average" typically is defined over a time period comparable to a detection integration or shutter period. In embodiments where the TOF system clock is actually the modulation clock or high speed source, then the frequency of the TOF system clock and the frequency of any generated clock are well controlled in a coherent fashion.

Figure 3:
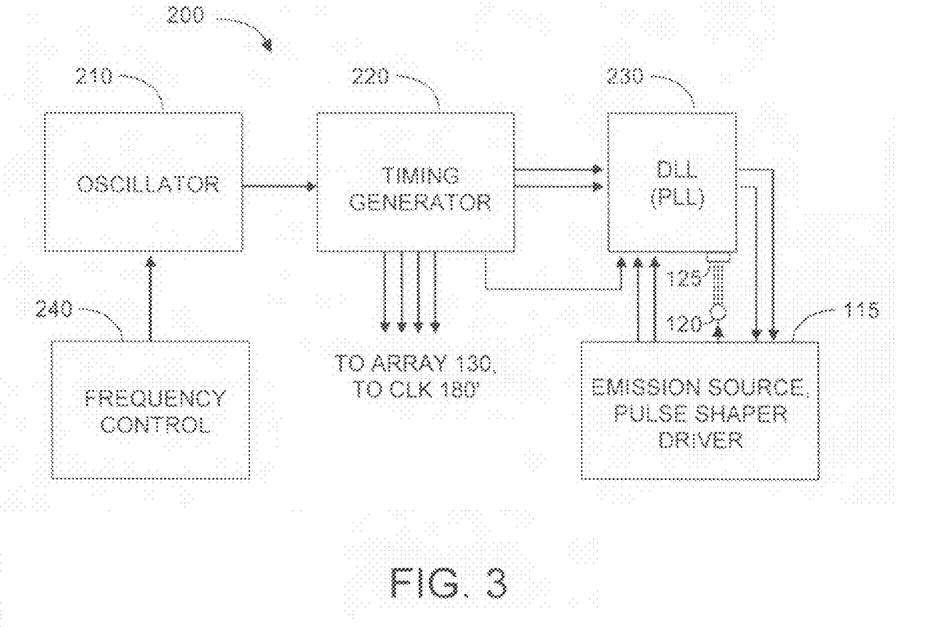
FIG. 3 is a block diagram of an enhancing timing unit, such as used in the TOF system of FIG. 2, according to an embodiment of the present invention.

Referring to FIG. 3, high-speed oscillator 210 has a clock signal output whose frequency may be in the range of perhaps 0.5 GHz to about 1 GHz or higher that is input to precise multiphase timing generator 220. Timing generator 220 can output few or many output signals, depending upon the specific application at hand. Further, the phase and pulse width of signals output from timing generator 220 can be fixed or fully independent, again as a function of the system application at hand. The action of block 220 together with frequency control block 240 controls the phase and timing (units of time) relationships of these clock output signals so as to be substantially constant.

According to an embodiment of the present invention, single or multiple phase clock signals from block 220 are coupled to clock unit 180' (see FIG. 2). Preferably DLL unit 230 outputs signals commanding desired pulse shapes at driver unit 115, which pulses cause emitter source(s) 120 to output electromagnetic emissions having requisite waveform rise and fall times. As noted, a detector or fiber optic or other device 125 can obtain a high quality sample of the actual pulse waveforms output by emitter source(s) 120, to enable DLL unit 230 and driver 115 to maintain high quality waveform output waveforms. Although FIG. 2 depicts a single emitter 120, it is understood that symbol 120 may in fact represent more than once source of emission.

Various feedback loops are shown in FIG. 2. As shown by block 230, preferably the feedback control mechanism used to adjust and stably maintain a desired phase of an emitted signal is a so-called DLL, or delay-locked loop. In a DLL control loop, phase of at least one emitted signal(s) is kept constant so that overall measurement accuracy by system 100' is substantially uncompromised by changing environmental conditions. In one embodiment, DLL control preferably is accomplished by DLL block 230 comparing the phase of signals output by emitter 120, as sensed by a fiber optic or dedicated sensor 124, to a desired reference signal phase. The comparison then collectively or individually adjusts the outgoing signal phases so as to keep these phase relationships constant. A DLL is somewhat similar to a PLL, except that a variable delay-chain is used in place of a variable oscillator to control the output signal.

In one embodiment, frequency control preferably is accomplished through a loop implemented in software, and the frequency of high-speed oscillator unit 210 is controlled through a digital register in the following manner. The output frequency of oscillator 210 is divided-down and then used to sample the system clock, e.g., see 180', whose clock frequency is stable and known with high precision. The number of system clock pulses occurring during a sample period of the divided-down oscillator clock is used to calculate oscillator frequency for block 210. If the frequency is too high or too low, an appropriate change in the digital code controlling high-speed oscillator 210 is applied such that average oscillator frequency is substantially maintained at a target value. Those skilled in the art will appreciate that alternate embodiments may control frequency using techniques that are not completely software controlled.

Accuracy of the controlled high frequency is affected by precision of the digital code controlling the high-speed oscillator and the ratio of periods of the divided down high-speed oscillator clock signal and the system clock signal. Those skilled in the art will appreciate that other techniques for frequency control may be used, for example employing standard PLL or DLL techniques that do not require active software control other than perhaps to write values into static registers. However such alternative techniques require an additional well controlled reference frequency signal as an input, and can limit the choice of frequency of oscillation.

In a preferred embodiment, timing generator 220 is implemented using a set of programmable digital counters that allow positioning phase of both rise-time and fall-time of a given pulse output by emitter 120, independently of all other outputs. While not always required for every application, such programmability and output independency advantageously enables software-only reconfiguration. This flexibility can be particularly valuable in applications where relative timing/phase of an output signal(s) must be precisely varied to yield highly accurate distance measurements.

In the present invention, output phases are generated directly from input clock transitions. Thus, achievable output clock phase resolution is determined by the ratio of the period of the output clocks compared to the input clock driven by high-speed oscillator 210. Understandably this ratio may, but need not be, programmable.

In the above-described fashion, multiple clock signals having precise phase relationships can be generated as required to obtain highly accurate distance measurements. The programmability and independency of the output phases can also be utilized to center overall loop delay within the capture/tracking range of DLL unit 230. This aspect helps enable a delay line with sufficiently small delay increments to satisfy distance accuracy requirements. The above-described embodiment used a single input from a high speed oscillator 210. However, alternative implementations could employ the multiple phases from a DLL controlled delay chain, or multiple phases from an oscillator itself to generate desired output phases.

As noted, responsive to pulses from driver 115, optical energy source 120 emits electromagnetic pulses. On one hand, controlling timing of such emitted pulses can be as simple as providing a single amplitude pulse of precise timing and duration. On the other hand a more complicated approach may be required, particularly for emitters 120 that impose bandwidth limitations relative to the frequency of pulses to be emitted.

In such bandwidth limited case, the multiphase capability of timing generator 220 can be used to produce pulses of different phases and/or durations, which pulses can be combined to create a multiple level pulse. This may be accomplished by providing at least two parallel voltage-to-current drivers whose outputs can be summed to produce the desired response. Amplitude weighting may be achieved by current ratioing the relative contributing effect of each driver to the overall pulse. In this manner, the rise-time and fall-time of the pulse output by emitter 120 can be shortened and controlled to meet system 100' performance requirements. Voltage, rather than current, summing techniques can be used, providing bandwidth requirements are met for accurate emission pulse control.

The delay control loop function preferably is carried out by a delay-locked loop (DLL) unit 230 that typically includes a variable delay line, a phase detector, and filtering. Within unit 230, a phase detector compares the DLL output feedback signal to a reference signal to produce a corresponding output signal that indicates the direction, or direction and magnitude of phase error between these two phase detector input signals. The phase detector error output signal preferably is integrated and/or filtered. The thus-processed signal is input to a delay control of a variable delay line and directly affects the phase of the output (feedback) signal. The feedback and reference signals are coupled to the phase detector inputs in a negative feedback configuration, so the feedback loop can minimize phase difference between these two signal inputs. In this fashion the DLL attains equilibrium, with phase error at the phase detector input ideally being driven to zero. If and when environmental conditions change and cause shift in the output phase, the DLL loop automatically re-adjusts the delay to compensate for and minimize phase error. A fast response time may be required if multi-rate frequencies are used. Those skilled in the art will appreciate that implementations of the above-described functions may include digital and/or analog implementations.

In a preferred embodiment, frequency control unit 240 includes a software algorithm. This algorithm applies a running average of several most recent frequency readout register values to make decisions about adjustments needed for the digital code that controls high-speed oscillator 210. The number of register values used typically is dictated by resolution requirements. For example, one embodiment used sixteen of the most recent frequency readout register values. This averaging technique advantageously maintains the long-term average frequency of oscillator 210 and consequently maintains the timing relationships of the output clock signals from timing generator 220, as expressed in units of time.

Referring still to FIG. 3, timing generator 220 preferably is implemented with a single input, and provides clocking for a set of multi-bit, individually programmable linear feedback shift register (LFSR) counters. Preferably one LFSR counter is used as a master that determines the frequency ratio of the output clocks relative to the input clock. The other LFSR counters preferably are slaved off of the master. In an exemplary embodiment, ten-bit LFSR counters were employed.

In a preferred embodiment, there are two LFSR counters for each clock output. In this configuration, one LFSR generates an output rising (e.g., 0-to-1) timing pulse, and the other LFSR generates a falling (e.g., 1-to-0) timing pulse. In this fashion, collectively these LFSR counter pairs determine rise and fall phase of an individual output pulse relative to the master LFSR counter. Thus output pulses are ensured to be substantially if not completely phase accurate with respect to each other. The action of timing generator block 220 together with frequency control mechanism 240 controls phase and timing (measured in units of time) relationships of these clock outputs so as to be constant. Thus, driver 115 (see FIG. 2) will cause light source(s) 120 to emit well shaped output pulses of optical energy.

Preferably the present invention also controls the shape of pulses emitted by driver 115 as input to light source(s) 120. If light source(s) 120 include LEDs, preferably two separate clocks are generated for use in driving the LED light source(s). One clock signal provides the "main" pulse, while the other clock signal provides a so-called "kicker" pulse. The main pulse has approximately a 50% duty cycle, with the same on-duration as clocks to pixel array 130. The kicker pulse is used to shorten effective rise time of the light emission pulse output by light source(s) 120.

In a preferred embodiment, the above-described two clock signals drive separate buffers, each having an independently generated power supply. In turn, these two buffers preferably drive separate high-frequency power FETs, whose summed outputs, when turned-on, pull current through LEDs 120. The ratio of the amplitude of the current pulses from the "main" and "kicker" pulses is advantageously varied by controlling the power supplies for these two buffers. Desired system performance is thus controlled by adjusting pulse position and duration of the "kicker" pulse relative to the "main" pulse, and by controlling the power and timing of the light pulse emissions. If light source(s) 120 are implemented with faster operating devices such as laser-based sources, the above-described techniques may not be required.

In a preferred embodiment, the architecture topology associated with DLL unit 230 is such that more than one DLL can be operated fully independently to control one or more emitters 120. In one embodiment, a first DLL acts as a master such that the delay associated with a second, slave, DLL is controlled by the master DLL. The master-slave DLL pair may be used with a single emitter 120 that requires two separate clocks, e.g., a "main" clock and a "kicker" clock. Alternatively, the master-slave DLL pair might be used to independently control two different emitters 120 that act independently. A presently implemented embodiment uses a digitally controlled delay-locked loop, although an analog controlled loop could also be used.

With respect to FIG. 3, for a digitally controlled loop preferably each DLL block 230 includes a phase detector, an accumulator, a delay increment counter and encoder, and a variable delay line. An analog implementation would provide analog counterparts, for example integrating filter(s) instead of a digital accumulator, etc. In practice, a reference signal is used as the sampling clock for an early-late detector. This implementation provides a binary, e.g., early state/late state, determination of relative phase of the feedback signal returned from the outgoing signal. The DLL accumulator keeps track of the imbalance of early and late indications from the phase detector. Preferably this accumulator is register-programmable, and when imbalance reaches the programmed threshold value, the DLL block preferably triggers an increment or decrement in the delay count. The delay count value may be encoded and can be used to directly change actual delay line phase shift in discrete increments.

During acquisition, the above-described linear search process continues until equilibrium is achieved. At equilibrium, occurrence of early and late indication samples is closely matched, and phase shift of the delay line stabilizes. In practice, however, the binary characteristic of the phase detector and discrete delay steps associated with the delay line will cause some dither in the delay line. Thus, the delay count and hence the delay line phase shift may dither between adjacent values. Advantageously, delay measurement accuracy should not be substantially impacted because monotonicity is guaranteed, and there is sufficient resolution in the phase shift increments of the delay line and associated counters.

Figure 4A:
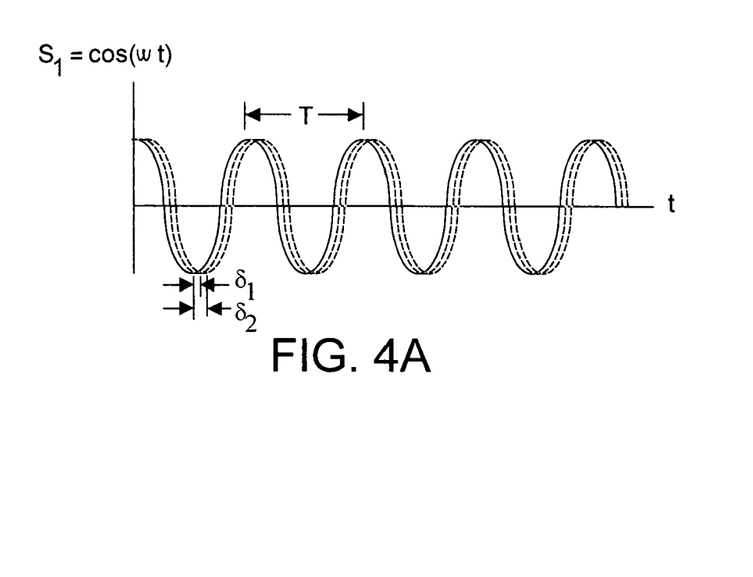
FIGS. 4A-4C depict optical energy waveforms output by a TOF system provided with an embodiment of the present invention.
Figure 4B:
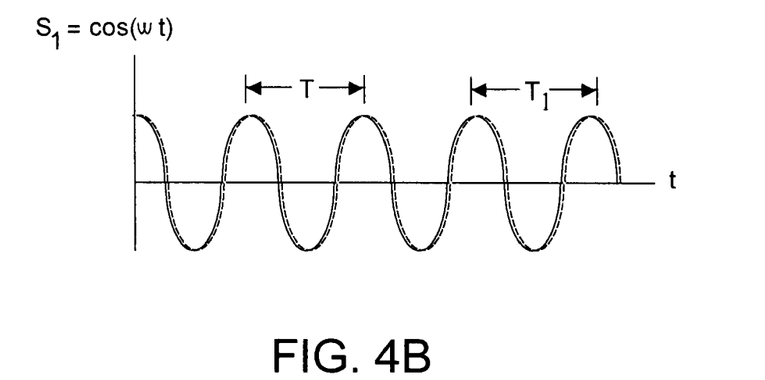
Figure 4C:
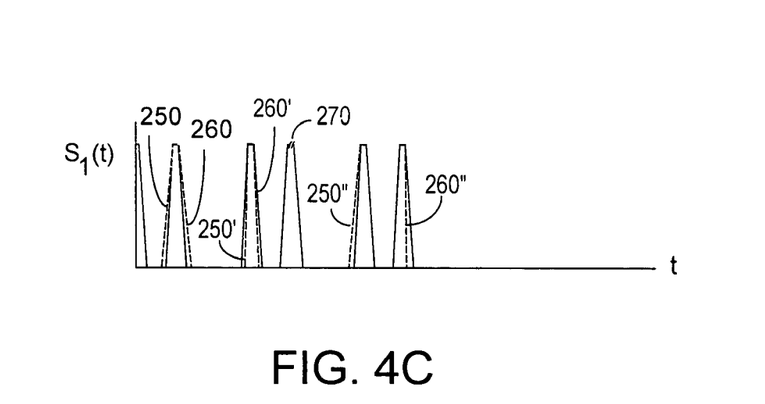

FIGS. 4A-4C depict control over various characteristics of the $S_1(t)$ waveform of optical energy emitted by emitter 120, according to aspects of the present invention. For example, FIG. 4A depicts a periodic sinusoidal type waveform $S_1(t)$ emitted by TOF system 100' in which a precisely controlled amount of offset phase shift, e.g., $\delta_1$, $\delta_1$ is introduced into the emitted optical energy waveform. In FIG. 4B, the same type of waveform has its emitted frequency intentionally finely controllably changed by the present invention, the frequency change being indicated by the change in period between T and $T_1$. It is understood that if desired, the emitted $S_1(t)$ waveform could include both change in frequency and in offset phase shift. Some embodiments of TOF system 100' may emit period trains of pulses $S_1(t)$ rather than sinusoidal type waveforms. FIG. 4C depicts an exemplary such $S_1(t)$ waveform in which the leading edge 250 may be changed independently of the falling edge 260 to length or as shown by 250', 260' to shorten effective pulse duration. As indicated by 270, embodiments of the present invention can lengthen or shorten effective $S_1(t)$ pulse duration without affecting rise or fall times. Finally, as shown by 250" or 260", embodiments of the present invention can affect the shape of the leading edge without affecting the shape of the trailing edge of $S_1(t)$, or vice versa. This dynamic flexibility by the present invention enables fine control and stability over the emitted $S_1(t)$ optical energy waveform, with resultant enhanced timing performance for TOF system 100', with improved Z data. Accuracy of measurement data can be enhanced by at least 25% for errors associated with emitted optical energy phase drift, and TOF system frequency drift. Preferably the various embodiments of the present invention are implemented in a manner as to be CMOS-compatible with the various TOF system components that are typically CMOS-implemented on IC 110.

Modifications and variations may be made to the disclosed embodiments without departing from the subject and spirit of the invention as defined by the following claims.

What is claimed is:

1. For use with a time-of-flight (TOF) imaging system that includes an optical energy emitter unit, and an array of optical detectors operable synchronously relative to signals from a TOF system clock governing operation of said optical energy emitter unit, said array detecting at least a fraction of emitted optical energy reflected by a target object, and further includes means for determining distance Z to the target object from detected reflected optical energy, an enhanced measurement system that improves measurement accuracy of said TOF system comprising:
   a timing generator that generates at least one clock signal whose average clock frequency is controlled to better than about ±1% of nominal frequency, said timing generator coupled to said TOF system clock; and
   a feedback mechanism, operable absent coupling to said array of optical detectors, coupled to said timing generator and responsive to a signal representative of optical energy from said optical energy emitter unit;
   wherein at least one temporal characteristic of optical energy emitted by said optical energy emitter unit is more precisely controlled than if said TOF imaging system operated without said enhanced measurement system.

2. The enhanced measurement system of claim 1, wherein said TOF imaging system determines said distance Z using at least one of (i) knowledge of when in time said optical energy emitter unit begins to emit optical energy, (ii) knowledge of when in time said optical energy emitter unit ceases to emit optical energy, and (iii) relative shift in phase between emitted optical energy and reflected detected optical energy.

3. The enhanced measurement system of claim 1, wherein said timing generator includes at least one of (i) an oscillator operable over a frequency range of at least about 0.5 GHz to about 1.0 GHz coupled to said timing generator, (ii) an oscillator operable over a frequency range of at least about 0.5 GHz to about 1.0 GHz and input to said timing generator, and (iii) an oscillator operable over a frequency range of at least about 0.5 GHz to about 1.0 GHz embedded within said timing generator.

4. The enhanced measurement system of claim 1, wherein frequency control is implemented using at least one of (i) a digital hardware closed loop, (ii) a software controlled loop (SCCL) unit, and (iii) a phase lock loop (PLL) unit.

5. The enhanced measurement system of claim 1, wherein, relative to a reference clock, a clock signal generated by said timing generator has a clock signal phase and a clock signal width that are controllable independently of each other.

6. The enhanced measurement system of claim 1, wherein said feedback mechanism includes at least one of (i) a digital delay line loop (DLL) unit, (ii) a phase lock loop (PLL) unit, and (iii) a software controlled closed loop (SCCL) unit.

7. The enhanced measurement system of claim 1, wherein at least one temporal characteristic of emitted optical energy emitted by said optical energy emitter unit is controlled and selected from a group consisting of (i) zero-to-active state transition time of emitted said optical energy, (ii) active state-to-zero transition time of emitted said optical energy, and (iii) phase shift of emitted said optical energy relative to phase shift of a signal controlled said timing generator.

8. The enhanced measurement system of claim 1, further including means for optical energy sensing, coupled to said optical energy emitter unit, to sense actual emitted optical energy.

9. The enhanced measurement system of claim 1, wherein said timing generator controls at least one characteristic of an optical energy waveform emitted by said TOF system, said characteristic selected from a group consisting of (i) shape of rise time, (ii) shape of fall time, (iii) effective pulse width, (iv) initial offset phase, and (e) repetition frequency.

10. For use with a time-of-flight (TOF) imaging system that includes an optical energy emitter unit, and an array of optical detectors operable synchronously relative to signals from a TOF system clock governing operation of said optical energy emitter unit, said array detecting at least a fraction of emitted said optical energy reflected by a target object, and further includes means for determining distance Z to the target object from detected reflected optical energy, a method to enhance accuracy of measurements made by said TOF imaging system, the method comprising the following steps:
   (a) providing a timing generator generating at least one clock signal whose average clock frequency is controlled to better than about ±1% of nominal frequency, which clock signal is coupled to said TOF system clock; and
   (b) employing feedback, operable absent coupling to said array of optical detectors, coupled between said timing generator, which feedback is responsive, to a signal representative of optical energy from said optical energy emitter unit;
   wherein at least one temporal characteristic of optical energy emitted by said optical energy emitter unit is more precisely controlled than if said TOF imaging system operated without carrying out the method of step (a) and step (b).

11. The method of claim 10, wherein said TOF imaging system determines said distance Z using at least one of (i) knowledge of when in time said optical energy emitter unit begins to emit optical energy, (ii) knowledge of when in time said optical energy emitter unit ceases to emit optical energy, and (iii) relative shift in phase between emitted optical energy and reflected detected optical energy.

12. The method of claim 10, wherein said timing generator provided at step (a) includes at least one of (i) an oscillator operable over a frequency range of at least about 0.5 GHz to about 1.0 GHz coupled to said timing generator, (ii) an oscillator operable over a frequency range of at least about 0.5 GHz to about 1.0 GHz and input to said timing generator, and (iii) an oscillator operable over a frequency range of at least about 0.5 GHz to about 1.0 GHz embedded within said timing generator.

13. The method of claim 10, wherein frequency control is implemented using at least one of (i) a digital hardware closed loop, (ii) a software controlled loop (SCCL) unit, and (iii) a phase lock loop (PLL) unit.

14. The method of claim 10, wherein, relative to a reference clock, a clock signal generated by said timing generator has a clock signal phase and a clock signal width that are controllable independently of each other.

15. The method of claim 10, wherein step (b) includes at least one of (i) a digital delay line loop (DLL) unit, (ii) a phase lock loop (PLL) unit, and (iii) a software controlled closed loop (SCCL) unit.

16. The method of claim 10, wherein at least one temporal characteristic of emitted optical energy from said optical energy emitter unit is controlled and selected from a group consisting of (i) zero-to-active state transition time of emitted said optical energy, (ii) active state-to-zero transition time of emitted said optical energy, and (iii) phase shift of emitted said optical energy relative to phase shift of a signal controlled said timing generator.

17. The method of claim 10, further including coupling means for optical energy sensing to said optical energy emitter unit to sense actual emitted optical energy.

18. The method of claim 10, wherein said timing generator provided at step (a) controls at least one characteristic of an optical energy waveform emitted by said TOF system, said characteristic selected from a group consisting of (i) shape of rise time, (ii) shape of fall time, (iii) effective pulse width, (iv) initial offset phase, and (e) repetition frequency.

19. For use with a time-of-flight (TOF) imaging system that includes an optical energy emitter unit, and an array of optical detectors operable synchronously relative to signals from a TOF system clock governing operation of said optical energy emitter unit, said array detecting at least a fraction of emitted said optical energy reflected by a target object, and further includes means for determining from detected reflected optical energy distance Z to the target object, a method to enhance accuracy of measurements made by said TOF imaging system, the method comprising the following steps:

(a) providing a frequency controller outputting at least one oscillator frequency control signal whose average clock frequency is controlled to better than about ±1% of nominal frequency;

(b) providing an oscillator operating at a frequency higher than said TOF system clock, coupled to said frequency controller, and having at least one output frequency controlled by said oscillator frequency control signal;

(c) providing a timing generator, coupled to receive at least one output from said oscillator, generating at least one clock signal coupled to said TOF system clock;

(d) coupling a feedback mechanism to said timing generator and responsive to optical energy sensed directly at said optical energy emitter; and (e) coupling an emission source unit to an output from said feedback mechanism and to an input of said optical energy emitter;

wherein at least one temporal characteristic of optical energy emitted by said optical energy emitter is more precisely controlled than if said TOF system operated without said time measurement method.

20. The method of claim 19, wherein said feedback mechanism includes at least one of (i) a digital delay line loop (DLL) unit, (ii) a phase lock loop (PLL) unit, and (iii) a software controlled closed loop (SCCL) unit.

* * * * *

UNITED STATES PATENT AND TRADEMARK OFFICE
CERTIFICATE OF CORRECTION

PATENT NO. : 7,636,150 B1
APPLICATION NO. : 11/998713
DATED : December 22, 2009
INVENTOR(S) : Richard J. McCauley and Dane R. Snow It is certified that error appears in the above-identified patent and that said Letters Patent is hereby corrected as shown below:

Title Page; item (75);

The spelling of the name of the second inventor is corrected from "Dana R. Snow" to "Dane R. Snow".

Signed and Sealed this

Eleventh Day of May, 2010

David J. Kappos
*Director of the United States Patent and Trademark Office*